May 24, 1949.  R. W. BARRINGTON  2,470,842
TRAILER HITCH
Filed Dec. 6, 1946  2 Sheets-Sheet 1
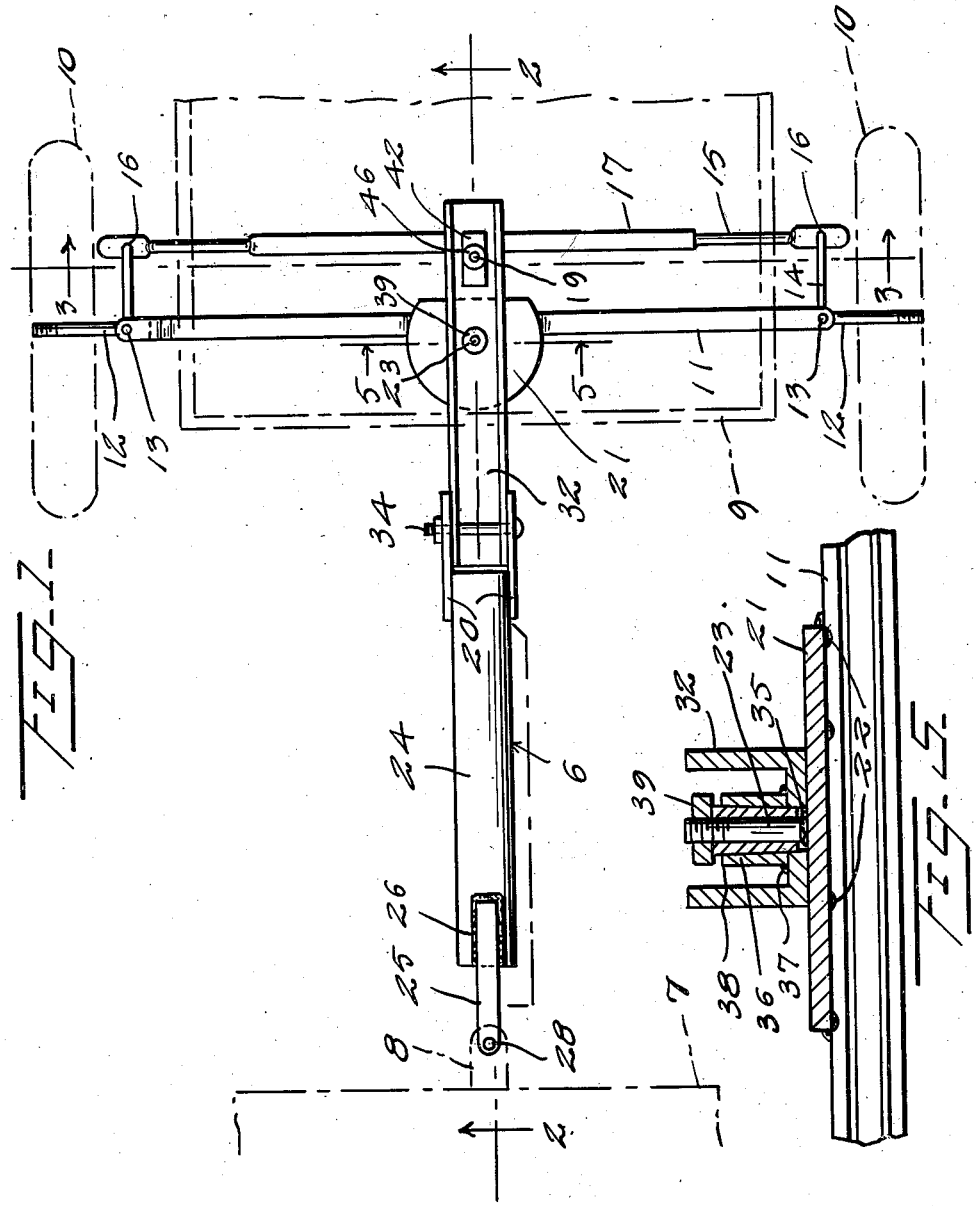
Inventor
Robert W. Barrington
By Randolph & Beavers
Attorneys

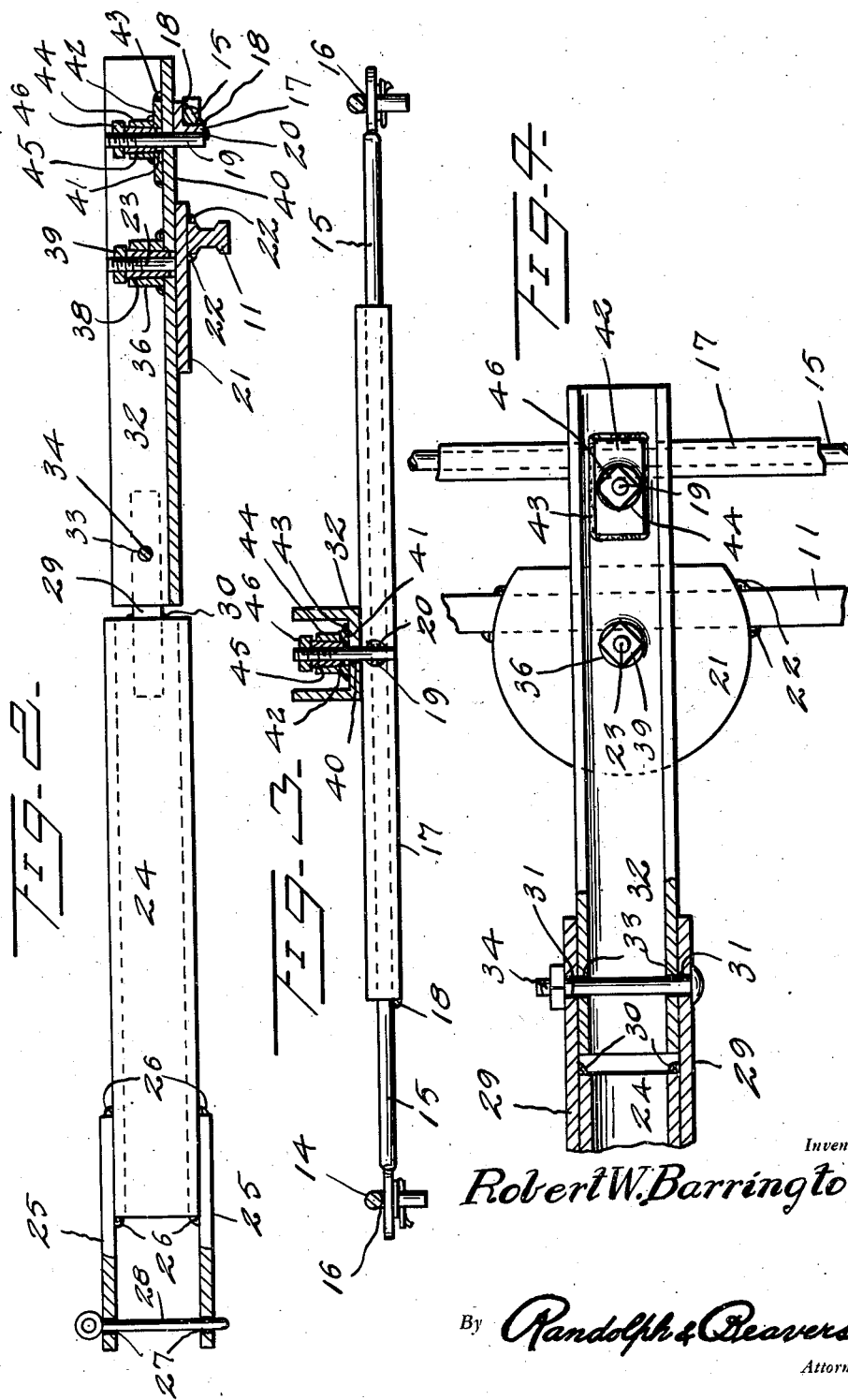

Patented May 24, 1949

2,470,842

UNITED STATES PATENT OFFICE 2,470,842

TRAILER HITCH

Robert W. Barrington, Throckmorton, Tex.

Application December 6, 1946, Serial No. 714,528

1 Claim. (Cl. 280—33.55)

This invention relates to a novel construction of hitch for connecting a trailer vehicle to a draft vehicle and more particularly to a trailer hitch adapted for use with trailer vehicles having four or more wheels and including two front steering wheels.

It is a primary object of the present invention to provide a trailer hitch adapted to be connected to the front steering wheels of a trailer vehicle for causing said wheels to be steered by the draft vehicle so that the trailer vehicle will substantially follow in the path of the draft vehicle in making turns and by means of which the trailer vehicle may be readily backed and caused to turn in the same direction that the draft vehicle is turned in backing.

Various other objects and advantages of the invention will hereinafter become more fully apparent from the following description of the drawings, illustrating a preferred embodiment thereof, and wherein:

Figure 1 is a plan view of the invention shown attached to the rear end of a draft vehicle and to the forward end of a trailer vehicle, parts of said vehicles being shown or indicated by broken lines;

Figure 2 is a longitudinal vertical sectional view of the trailer hitch and with certain of the parts of the draft vehicle shown in section taken substantially along a plane is indicated by line 2—2 of Figure 1;

Figure 3 is a transverse vertical sectional view taken substantially along a plane as indicated by the line 3—3 of Figure 1;

Figure 4 is an enlarged fragmentary plan view, partly in horizontal section, of a portion of the trailer hitch and associated parts of the trailer vehicle, and Figure 5 is a cross sectional view taken substantially along a plane as indicated by the line 5—5 of Figure 1 and on an enlarged scale.

Referring more specifically to the drawings, for the purpose of illustrating a preferred adaptation of the trailer hitch, designated generally 6 and comprising the invention, a portion of the rear end of a draft vehicle is shown in Figure 1 in dotted lines at 7 and includes a rearwardly extending apertured coupling link 8. A portion of the forward end of a trailer vehicle 9 and the front wheels 10 thereof are likewise shown in dotted lines in Figure 1. Additional parts of the trailer vehicle are illustrated in full lines in Figure 1 including the front axle 11 having stub axles 12 projecting from the ends thereof and on which the wheels 10 are journaled. The stub axles 12 are mounted to swing horizontally relatively to the axle 11 by means of the vertically disposed pivot 13, and each of said stub axles is provided with a rearwardly extending lever 14 which projects from the inner, pivoted end thereof and which may be suitably connected to or formed integral with its associated stub axle. A tie rod 15 is disposed transversely of the trailer vehicle 9 and substantially parallel to the axle 11 and is pivotally connected adjacent its ends at 16 to the rear, free ends of the levers 14, for connecting the wheels 10 to cause said wheels to turn in unison. As best seen in Figure 2, a length of angle iron 17 is welded or otherwise secured at 18 to the intermediate portion of the tie rod 15 and has a perpendicular forward side to which an upwardly extending pin 19 is welded or otherwise secured at 20. A journal plate 21 is welded or otherwise secured to the upper side of the intermediate portion of the axle 11 by welds 22 and is likewise provided with an upstanding pin 23 which is suitably secured thereto. As seen in Figure 1, the plate 21 has an arcuate, convex forward edge which protrudes substantially forwardly of the axle 11 and a substantially straight rear edge which is disposed behind but adjacent to the axle and spaced a substantial distance from the angle iron 17 and the tie rod 15.

The trailer hitch 6 comprises a tongue having a forward portion formed by a length of pipe or other tubular member 24 to the forward end of which a pair of bars 25 are welded or otherwise secured at 26. The bars 25 are disposed on the outer side of the pipe 24 and at the top and bottom thereof and extend from the forward end of said pipe and are provided adjacent their outer, free ends with aligned openings 27. The free ends of the bars 25 are adapted to be disposed above and beneath the coupling link 8 and with the apertures 27 thereof aligning with the apertures, not shown, of the link 8 for receiving a coupling pin 28, by means of which the trailer hitch or tongue 6 is pivotally connected to the draft vehicle 7 for swinging movement in substantially a horizontal plane.

As best seen in Figure 4, a pair of bars 29 are welded or otherwise secured at 30 to the outer side of the pipe 24, adjacent the rear end thereof, and have free ends extending rearwardly therefrom and provided with aligned apertures 31. The bars 29 are disposed at the sides of the pipe 24 and substantially in horizontal alignment. A length of channel iron 32, forming the rear end of the hitch or tongue 6 has a forward end disposed between the rearwardly extending, free ends of the bars 29 and the upstanding sides of said forward end are provided with aligned apertures 33 which are adapted to be disposed to align with the apertures 31 for receiving the shank of a nut and bolt fastening 34 which extends therethrough and by means of which the pipe or forward section 24 of the tongue 6 is pivotally connected to the channel member or rear section 32 of said tongue.

As best seen in Figures 1 and 5, the channel member 32 extends over the journal plate 21 and has a portion of its base resting thereon and said base portion is provided with an opening 35 to loosely receive the journal pin 23. The channel member 32 is provided with an upstanding sleeve 36 which is welded or otherwise secured to the base portion of said channel member as seen at 37 and which is disposed to surround the opening 35. The pin 23 extends loosely through and to above the sleeve 36 and is provided with a threaded upper end. A downwardly tapered bushing member 38 is disposed in the sleeve 36 and between said sleeve and the pin 23 and forms a bearing for the pin. A nut 39 threadedly engages the upper end of the pin 23 and bears against the upper end of the bushing 38 for urging it downwardly into the sleeve 36 for holding the pin 23 against play or other movement with respect to the sleeve 36 and the channel member 32. It will be readily obvious that the nut 39 may be tightened to compensate for wear as required.

As best seen in Figures 2 and 3, the rear portion of the base of the channel member 32 extends transversely across the intermediate portion of the angle member 17 and is provided in the base thereof with an opening 40 for loosely receiving the upwardly extending pin 19 which extends upwardly therethrough into the channel member 32 and through an opening 41 in a reinforcing plate 42 which is welded or otherwise secured at 43 to the upper side of the base portion of the channel member 32. A sleeve 44 is welded or otherwise secured to the upper side of the plate 42, around its opening 41, and extends upwardly therefrom to receive the pin 19 which projects loosely therethrough and which is provided with a threaded upper end, disposed above the sleeve 44. An externally and downwardly tapered bushing 45, corresponding to the bushing 38, is disposed in the sleeve 44 and between said sleeve and pin 19 and is urged downwardly by a nut 46, which is disposed thereabove and on the threaded upper end of the pin 19, for the same purpose as heretofore described in reference to the bushing 38 and nut 39.

From the foregoing it will be readily apparent that the hitch 6 may be readily interposed between the rear end of the draft vehicle 7 and the forward end of the trailer vehicle 9 for connecting said vehicles together and so that the trailer vehicle 9 will be drawn behind the draft vehicle 7 when the latter is moving in a forward direction. The coupling pin 28 permits the tongue 6 to swing relatively to the coupling link 8 when the draft vehicle 7 is turned. It will be readily apparent that when the draft vehicle 7 is moving forwardly and is turned, that the forward end of the tongue 6 will be swung thereby in the direction that the draft vehicle is turning for swinging the rear end of the tongue on the pivot 23 in the opposite direction, to thus cause the wheels 10 of the trailer vehicle to turn in the same direction as the draft vehicle so that the trailer vehicle will substantially follow in the track or path of the draft vehicle.

It will also be readily apparent that the hitch or tongue 6 will effectively control the direction of movement of the trailer 9 when the draft vehicle 7 is backed to prevent the connection between the vehicles from buckling as frequently occurs with ordinary trailer hitches and also to permit the draft vehicle to be turned and backed with the assurance that the trailer vehicle will be caused to turn in the same direction.

Various modifications and changes are contemplated and may obviously be resorted to, without departing from the spirit and scope of the invention as hereinafter defined by the appended claim.

I claim:

In a trailer hitch, in combination with a draft vehicle having a rearwardly projecting coupling link and a trailer vehicle having front steering wheels connected by a tie rod, an elongated tongue, a coupling pin connecting said tongue at its forward end to the coupling link of the draft vehicle for swinging movement of said tongue in substantially a horizontal plane relatively to the draft vehicle, a pin secured to the trailer vehicle and disposed substantially perpendicularly thereof and to which said tongue is pivotally connected adjacent its rear end, and means for pivotally connecting said tongue to the tie rod rearwardly of said pin, said last mentioned pivotal means and said pin providing pivots for permitting the swinging movement of said tongue in substantially a horizontal plane and whereby the tie rod will be moved laterally of the trailer vehicle, when the tongue is pivoted on said pin, for causing the steering wheels of the trailer vehicle to be turned in the same direction that the forward end of the tongue is moved, said trailer hitch being provided with adjustable wear compensating means associated with the journal of said pin and of said pivotal means to prevent reciprocating movement of the hitch relatively to the trailer vehicle, said wear compensating means including an upstanding sleeve fixed to the tongue and in which the pin is loosely disposed, an externally tapered bushing extending into the upper end of the sleeve and in which the pin is journaled, and adjustable means for urging the bushing downwardly into the sleeve.

ROBERT W. BARRINGTON.

REFERENCES CITED

The following references are of record in the file of this patent:

UNITED STATES PATENTS

| Number | Name | Date |
|---|---|---|
| 1,577,788 | Cole | Mar. 23, 1926 |
| 1,603,931 | Amundenson | Oct. 19, 1926 |